United States Patent
Bachu et al.

(10) Patent No.: US 9,098,432 B1
(45) Date of Patent: Aug. 4, 2015

(54) SYSTEM AND METHOD FOR DATA DEDUPLICATION OF BACKUP IMAGES

(75) Inventors: Kiran Bachu, Cupertino, CA (US); Arun Kumar Bhaskar, Bangalore (IN); Harish Jayaram, Bangalore (IN); Gururaj Kulkarni, Bangalore (IN)

(73) Assignee: EMC CORPORATION, Hopkinton, MA (US)

( * ) Notice: Subject to any disclaimer, the term of this patent is extended or adjusted under 35 U.S.C. 154(b) by 1083 days.

(21) Appl. No.: 12/099,598

(22) Filed: Apr. 8, 2008

(51) Int. Cl.
*G06F 17/00* (2006.01)
*G06F 11/10* (2006.01)

(52) U.S. Cl.
CPC .................................. *G06F 11/1076* (2013.01)

(58) Field of Classification Search
CPC combination set(s) only.
See application file for complete search history.

(56) References Cited

U.S. PATENT DOCUMENTS

| | | | |
|---|---|---|---|
| 7,472,242 B1* | 12/2008 | Deshmukh et al. | 711/162 |
| 7,685,459 B1* | 3/2010 | De Spiegeleer et al. | 714/6.12 |
| 7,778,526 B2* | 8/2010 | Zacek | 386/232 |
| 8,553,882 B2* | 10/2013 | Cholas et al. | 380/210 |
| 2003/0018878 A1* | 1/2003 | Dorward et al. | 711/216 |
| 2005/0234852 A1* | 10/2005 | Coramutla | 707/1 |
| 2005/0276580 A1* | 12/2005 | Zacek | 386/131 |
| 2006/0031216 A1* | 2/2006 | Semple et al. | 707/4 |
| 2006/0050996 A1* | 3/2006 | King et al. | 382/312 |
| 2008/0016131 A1* | 1/2008 | Sandorfi et al. | 707/204 |
| 2008/0262996 A1* | 10/2008 | Yogeshwar et al. | 707/1 |
| 2009/0210427 A1* | 8/2009 | Eidler et al. | 707/10 |
| 2012/0079054 A1* | 3/2012 | Moroney et al. | 709/213 |

* cited by examiner

*Primary Examiner* — Shyue Jiunn Hwa
(74) *Attorney, Agent, or Firm* — Dergosits & Noah LLP; Todd A. Noah

(57) ABSTRACT

The present invention is directed to a system and method for providing single instance storage of previously backed up data objects in archived backup storage, also known as data deduplication. Current deduplication methods implemented during backup and archiving of data do not work with previously backed up data. Previously backed up images may vary in format depending upon the method of backup and the type of backup system used. As a result, while future backup efforts may prevent multiple instances of backup data, previously backed up data may exist in multiple instances, wasting valuable storage space. The present invention decodes previously stored backup images for deduplication using an image adapter module that works cohesively with a deduplication engine, regardless of the format of the previously backed up images.

13 Claims, 1 Drawing Sheet

SYSTEM AND METHOD FOR DATA DEDUPLICATION OF BACKUP IMAGES

TECHNICAL FIELD

The present invention relates generally to backup technology, and specifically, to removing data redundancies in backup images.

BACKGROUND OF THE INVENTION

In order to preserve data, an organization will routinely perform backup and archiving operations of its file systems. A backup operation may either be a full backup session, where every file is copied to archive media, or it may be an incremental backup session, where less than every file is copied. An organization may schedule periodic full backup sessions, and may include incremental backups between each full backup. Since an incremental backup only includes the changes to the file system since the previous backup session, it may take less time than a full backup.

During a backup session, data files are transmitted, or "streamed," from a file system to a backup server. Backed up files may be stored in the backup server, or the backup server may coordinate writing the streamed data files to one or more archive media, such as a tape or disk. The resulting collection of backed up files produced after a backup operation is known as a backup image. Backup images are stored on tape, disk or other archive media and may be kept in a vault or other off-site location for disaster recovery purposes. Over time, an organization may collect large quantities of archive media containing these backup images.

In a large organization that uses a network of computers and servers, it is not uncommon for computers to share files or to store exact copies of files. For example, two or more computers may contain copies of certain operating system files, templates, emails or other data. Users may transmit data files to other users, who then keep these files without making any changes to them. As a result, the computers and servers on the network may have large amounts of data redundancies. As a further result, backups of these network files systems may also contain large amounts of data redundancies. Because of the space required for archive media, and the cost to retain long-term storage of backup images, needless copies of data files wastes valuable storage space and drives up the cost of archiving data.

Data redundancies may also occur between scheduled backup sessions, especially in cases when data files do not change between those backup operations. In other words, a file may be backed up multiple times in successive backup sessions, even though each backed up file is exactly the same in each subsequent backup image. This may occur in between full backup sessions, or even between incremental backup sessions. This is because any change to a data file, even an insubstantial change to a data file's metadata, may cause the file to be backed up even though that file's actual content may not be any different from the last backup session. The result may be a backup image that is substantially the same as a previous backup image. Such data redundancies between each backup image also wastes valuable storage space.

In response, some backup applications perform checks of file system data prior to backup or archive to ensure that unchanged files are not backed up more than once. Such efforts are called data deduplication or single instance storage. In other words, only a single copy, or "instance," of a file is backed up. For example, during a backup session, a backup application enabled with deduplication software or hardware will read streamed data files to see if an instance of a file has already been backed up during that session. This may occur before the backed up version of that file is written to media. As a result, the deduplication software or hardware will permit storage of a single instance of a data file each time that file is encountered for the first time. Once that data file has been added to the backup image or written to media, the deduplication software or hardware will disregard any additional instances of the file, and will only retain a single instance. It does not matter if the other instances of a file exist on other file systems; if that file system has been included in the backup operation, only a single instance is stored. The deduplication software or hardware will track where the multiple instances of that data file occurred, so that during recovery, those multiple instances will be restored even though only a single instance was stored.

Because deduplication preserves single instances of files for backup, archives are more streamlined and require less archive media, and therefore less storage space. In addition, deduplication reduces network traffic, both during streaming and writing to the archive media, as well as during restoration of the backed up data objects. Once implemented, deduplication reduces the amount of memory required during backup.

However, deduplication is only available once a deduplication engine has been installed to work with a backup application. In other words, prior art deduplication methods only benefit future backup sessions. Currently, there is no way to perform deduplication on previously stored backup images. Once file system data objects have been backed up or archived to create a backup image and/or written to media, prior art deduplication utilities cannot determine whether multiple instances of data objects exist in the backup image. Further, there is no way to deduplicate between backup images, such that a file that does not change between successive backup sessions is stored as single instance. What is therefore needed is a way to extend the benefit of deduplication to previously stored backup images, thereby reducing the size of legacy archives and still preserving the integrity of data backed up.

BRIEF DESCRIPTION OF THE FIGURES

The present invention is illustrated by way of example and not limitation in the figures of the accompanying drawings, in which like references indicate similar elements, and in which.

DETAILED DESCRIPTION OF THE INVENTION

Figure 1:
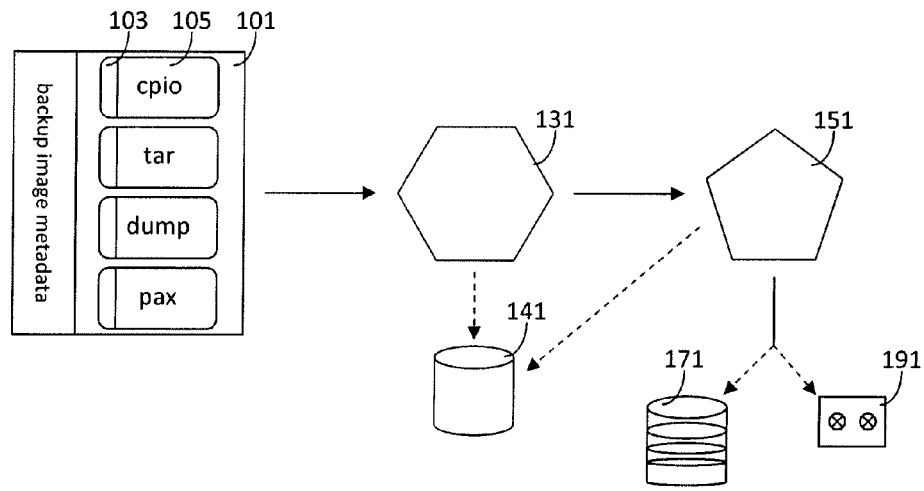
FIG. 1 is an exemplary block diagram depicting one embodiment of the present invention.
Figure 2:
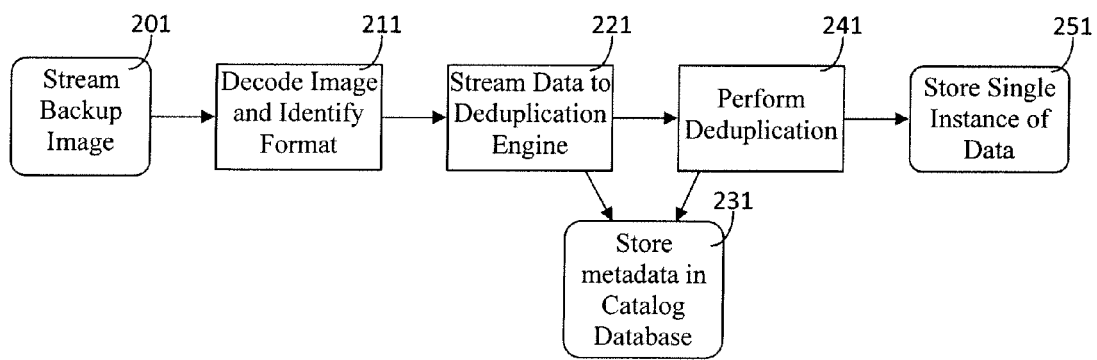
FIG. 2 is an exemplary flow diagram illustrating an embodiment of the present invention.

The present invention is a system and method for performing deduplication on previously archived backup images such that a file system may be deduplicated even after its data objects have been backed up or written to media. Using the present invention, previously archived backup images may be streamlined to remove multiple instances of backed up files. As a result, backup images may be reduced in size, reducing the amount of space taken up by large amounts of archive media needed. Leftover archive media that have been purged of data redundancies may be recycled or re-used for future backups. The present invention may deduplicate any backup image, without regard to the format or manner of the backup image's creation.

A person having ordinary skill in the art will appreciate that the terms "backup" and "archive" refer to two complementary storage concepts. In some contexts, backup refers to scheduled, automated, incremental short-term data object storage, whereas archive refers to manual, long-term data object storage. As a result, backup files and archive files may be distinguishable by their metadata, header information, or file extensions. However, as used herein, backup and archive are interchangeable since the present invention is able to perform deduplication on either backup files or archive files. The alternate use of the terms "backup" or "archive" is not meant to limit the invention in any way.

A person skilled in the art will appreciate that there are many software applications, commands or methods to backup or archive data, such as dump, tar, Open Tape Format, SCSI, NDMP, pax, VBB, cpio, etc. Each method has a different format and schema. Additionally, each software application that performs or manages the backup session may originate from a different vendor. As a result, there may be vendor-specific formats for each of the different backup methods. Because an organization may use a number of different backup or archive utilities from different vendors, or may use a single backup utility to perform different backup, it is not uncommon for the organization to store legacy backup images in different formats and/or created by different backup software.

It should be appreciated that the present invention can be implemented in numerous ways, including as a process, an apparatus, a system, a device, a method, or a computer readable medium such as a computer readable storage medium comprising computer program instructions, a software module containing computer program instructions or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

In this disclosure, the system components of the present invention are discussed first, followed by a description of the methods performed by the system components, according to an embodiment of the present invention. One will appreciate that the examples below are merely illustrative, and are not meant to limit the scope of the invention in any way.

A. System Architecture

FIG. 1 illustrates various hardware and software modules that may make up the present invention. The various methods performed by these modules are discussed further below. As shown, 101 is a backup image. One having ordinary skill in the art will appreciate that a backup image is a collection of all of the data objects backed up from a file system, and may include the complete contents (data and system files) of an entire drive, disk or file system, or may contain selected data objects from the file system. After a utility performs a backup or archive, the end result of an individual backup session is a backup image.

In FIG. 1, backup image 101 is comprised of a plurality of data objects, including data files, system files, and file directories. Each data object 105 may be associated with metadata 103, which may form part of a header file for the data object 105 or may be encoded into a header block for data object 105. The metadata 103 may contain information about the data object 105, identifying the type of data object it is, the data it may contain, the format of that data, whether the data object is linked to any related data objects, or other information about the data object. The metadata 103 associated with the data object 105 may contain information identifying the format or method used to backup data object 105. Apart from or in addition to the metadata 103 for each data object 105, backup image 101 may itself have metadata that identifies its format or method of creation. In addition, metadata for either the data objects or the backup image may also help differentiate which part of the backup image 101 is actual data content, and which part is merely information about that data.

The present invention includes an "image adapter" or "image decoder." This image adapter 131 may be used to read or "decode" backup image 101. As used herein, "decode" means differentiating which part of the backup image 101 or data object 105 is actual data, and which part is merely metadata 103 or merely information about that data. Decoding also determines the format of the backed up data, as well as the original path information for the data as it originally existed on the file system before backup. The decoding process will be discussed in further detail below.

As depicted in FIG. 1, in an embodiment, the present invention provides a bridge between the backup image 101 and a deduplication engine 151 through the use of the image adapter 131. The deduplication engine 151 is software or hardware responsible for accepting streams of data from image adapter 131 and identifying multiple instances of data objects from that stream of data. The deduplication engine 151 will only permit a single instance of a data object for storage. As such, deduplication engine 151 may be associated with either disk storage 171 or tape storage 191. After backup image 101 has been passed through the image adapter 131 and the deduplication engine 151, the resulting deduplicated image stored on tape 191 or disk 171 will be much smaller, since multiple instances of files 105 will have been removed.

Image adapter 131 may be connected to or associated with a catalog 141, which is a database or associative data array that stores information generated by the image adapter 131 and/or the deduplication engine 151. In an embodiment, the catalog 141 may also be associated with or may accept information from the deduplication engine 151. This information is separate from the backup files stored on tape 191 or disk 171, but may be additional metadata about these backed up files. For example, after a backup image 101 has been decoded by the image adapter 131, the data objects 105 may be streamed to the deduplication engine 151, but the metadata 103 associated with those data files 105 may be kept separate. The metadata 103 may contain information about the original file system that was backed up and stored as backup image 101. Other information generated by the image adapter 131 or the deduplication engine 151 may be hash values for identifying the streamed data objects 105. All of these various types of information, metadata or other data may be stored in catalog 141. As will be discussed further below, the information stored in catalog 141 may be useful when data objects are recovered from disk 171 or tape 191.

A person having ordinary skill in the art will appreciate that FIG. 1 is merely exemplary, and not meant to be limiting in any way. For example, in an embodiment, each of the software modules depicted in FIG. 1 may be implemented by a hardware device. In an embodiment, image adapter 131 and deduplication engine 151 may be contained in a single software application or hardware device. Also, in an embodiment, the reference 101 may be a backup tape repository having multiple backup images, rather than a single backup image as was discussed previously. In such a case, if reference 101 is a tape repository, then it may contain backup image 105 that is associated with its own metadata 103. In other words, the present invention contemplates multiple backup images written to media with a single metadata file for the entire collection of backup images, or multiple backup images written to media with metadata files for each of the data objects contained in the multiple backup images. Other variations are possible to illustrate the scalability and extensibility of the present invention.

B. Image Adapter

The method performed by the image adapter 131 is now described, according to an embodiment of the present invention. A person having ordinary skill in the art will appreciate that there are many ways that the image adapter 131 can perform its task of decoding backup images for the deduplication engine 151. As noted previously, the image adapter 131 decodes backup images to identify the format of the backup image 101, as well as which part of the data objects 105 that comprise backup image 101 is actual data content, and which part is metadata 103 for that data content. Each data object 105 may be associated with metadata 103 that contains information about the data object, such as file permissions, file stat (creation, modification, etc.), and/or inode or other file identifier ("FID") information, etc. The metadata may reveal how the data object 105 was compressed or converted to form part of the backup image 101, the other related data objects that comprise the backup image 101, and/or the backup utility used to create the backup image 101. Alternatively, the backup image itself may contain metadata that reveals this type of information. As such, decoding may involve reading the metadata for the backup image 101, reading the metadata 103 for each of the data objects 105, and/or reading a stream of the data objects 105 and metadata 103.

The image adapter 131 is designed to read both the metadata 103 for the data objects 105 contained in backup image 101 as well as the metadata specifically for the backup image 101 to determine the format of the backup image. In some cases, neither metadata 103 nor the backup image's metadata may reveal this information, or the image adapter 131 may be encountering a new backup format. In this circumstance, a system administrator may tell the image adapter 131 the format of the backup image. This may occur whenever the image adapter 131 fails to identify the format of the backup image. In an embodiment, the image adapter 131 may be updated remotely or directly with new backup image format information so that image adapter 131 may automatically recognize backup image formats without system administrator intervention. One will appreciate that once the image adapter 131 "learns" to recognize the format of a certain type of backup image, the image adapter 131 may automatically recognize this format the next time it encounters the same format of backup image.

For example, one skilled in the art will appreciate that a backup image may be preceded by a header file or a header block that contains metadata with information on the data objects included in the archive. The backup image may also have a file extension that identifies its file type, as well as the utility or command used to create the backup image. Either the header file metadata or the file extension may be useful in determining which part of the archive file should be streamed to the deduplication engine 151. The following examples illustrate some of the methods that may be performed by the image adapter 131 in order to prepare data objects from a backup image for streaming to the deduplication engine 151.

1. Decoding by Recognizing File Extension

The image adapter 131 may decode a backup image 101 by identifying the backup image 101's file type. The file type may be recognized by reading the file extension for a file, in this case the backup image 101. For example, the backup image 101 may be created using "cpio." One having skill in the art will appreciate that "cpio" is a type of binary file format and one of many ways to archive or backup data objects. "cpio" also refers to the software utility used to create a cpio file or backup image. A backup image created using a cpio utility or other equivalent cpio tool may have a ".cpio" file extension. The cpio utility may be used to create a cpio backup image out of stream of data objects, and may also be used to extract files from a cpio backup image to partially or completely recover an archived file system. One skilled in the art will recognize that a cpio backup image may also be referred to as a cpio archive file or simply, as a cpio file.

The image adapter 131 aspect of the present invention provides some of the functionality of a cpio tool in addition to the other features described. In an embodiment, a cpio backup image may be streamed to the image adapter 131. The image adapter 131 reads the cpio backup image, and automatically determines that this image was created using the cpio utility. The image adapter 131 may be instructed to recognize the ".cpio" file extension. Once it has identified that this backup image was created using the cpio utility, it can extract the data content and send it to the deduplication engine 151. Therefore, it is a feature of the present invention to provide for automatic recognition of certain archive file or backup image types based upon the file extension of these archive files. Once the image adapter 131 identifies the file type of the archive file or backup image, it may automatically extract the data files stored in the archive file or backup image and stream it to the deduplication engine 151.

The use of a file extension to recognize the format of a backup image 101 or the format of the data objects 105 that comprise the backup image 101 is one way the image adapter 131 may decode the backup image 101. One will appreciate that while a file extension may identify file format, the image adapter 131 may not uncover any vendor-specific format characteristics for a backup image. As such, the image adapter 131 may perform other methods in order to fully decode a backup image 101 for streaming data objects to the deduplication 151.

2. Decoding by Recognizing Header Information

In circumstances where the format of a backup image may not be revealed by referring to its file extension, it may be more practical for the image adapter 131 to read the metadata for backup image 101, or the metadata 103 contained in header files for each data object 105 that comprise backup image 101. In most cases, every backup or archive utility used to create backup image 101 will also associate metadata with each data object that comprises the archive file. This metadata 103 is typically written to a header block for each data object 105, and may include not only the identifying information for the associated data object, but may also reveal the format used to backup the data object 105. One skilled in the art will appreciate that while some backup images may include a file extension that reveals backup image format (as discussed above), it may be more convenient to refer to the backup image metadata or data object metadata 103 for this information. For example, while a cpio backup image may have the ".cpio" file extension, the metadata for that backup image will also reveal that it was created using the cpio utility.

"tar" is another common format and software utility used to create backup images. When tar is used, it creates a collection of data objects to form a single tar file, also known as a tar archive, tape archive or tar backup image. The data object content is unaltered, but each data object may be associated with a header block containing metadata that details the data object name, path address, owner name, size, last modification time, format and other information for the data object. The header block for data objects in a tar file is typically written in ASCII format, which may be read by the image decoder 131.

Therefore, in an example where the backup image 101 is a tar file comprised of data objects 105 and metadata 103 associated with each data object 105, the image adapter 131 may read the metadata 103 for each data object 105, extract each data object 105, then stream the data object 105 to the deduplication engine 151. Without the image adapter 131, the deduplication engine 151 is unable to read the backup image 101 and extract the data objects 105. Further, without the deduplication engine 151, the present invention is unable to deduplicate backup image 101, and identify which data objects 105 in backup image 101 are multiple instances.

One will appreciate that while backup utilities such as tar and cpio may be used to create tar files and cpio files respectively, other backup utilities are also capable of creating tar and cpio files. As such, it is important to recognize the file format of a backup image 101 no matter what software utility was used to create the backup image 101. For example, "pax" is a utility used to backup data objects which provides similar, if not all of the functionality provided by the tar and cpio archive utilities. The pax utility may save archive files or backup images in a number of different formats, including tar, cpio, or ustar. Therefore, while the file extension may reveal the format of a backup image, it may be more useful for the image adapter 131 to read the backup image 101's metadata or data object 105's metadata 103 to determine whether another utility has added additional format attributes.

The pax utility archives files as component files, and directories may be archived as component directories. The archive file, or backup image, is therefore comprised of these component files and component directories. Similar to the tar format, the component files and component directories may each be associated with metadata or header information. This information may detail the file or directory name, type, size, path information or other extended attributes for the backed up file. When a image adapter 131 encounters a backup image created using the pax utility, it will differentiate header information metadata from the actual data, and will stream the actual data to the deduplication engine 151. As such, the image adapter 131 may decode various backup image formats.

Another common file utility used to perform file system backup is "dump." One skilled in the art will appreciate that "dump" differs from tar or cpio in that it is Mode based and organizes backed up data object such that directories precede files. Despite these differences, the image adapter 131 is capable of reading the metadata for the backup image 101 or the metadata 103 for the backed up data objects 105 contained in backup image 101 to determine if backup image 101 was created using the dump utility.

A backup image 101 created using the dump utility may contain one or two bitmaps describing which Modes were in use when the dump utility was performing a backup, as well as which Modes were written to the backup media. In addition, each backed up data object 105 in backup image 101 may include metadata 103 stored as header information. This header information may include the file type, size, permissions, group, owner and other information for the backed up data object 105. Either the bitmap metadata for the backup image or the header information metadata 103 for each data object 105 may be read by the image adapter 131 to determine which data should be streamed to the deduplication engine 151 for deduplication. Once the image adapter 131 identifies that the backup image 101 was created using the dump utility, the image adapter 131 will be able to read the metadata 103 for each backed up data object 105, then stream the data content from each data object 105 to the deduplication engine 151 for single instance storage.

As the above examples show, the image adapter 131 is capable of receiving and identifying any number of different backup image formats, either by decoding the metadata 103 contained in header information for each data object 105 that forms part of the backup image 101, the metadata for the backup image 101 itself, or the file extension for the backup image 101. Using the image adapter 131, backup images may be placed in a form that can be read by the deduplication engine 151. The deduplication engine 151 provides the function of reducing space on archive media by storing only single instances of each data object. However, without the decoding function provided by the image adapter 131, the deduplication engine 151 would be unable to read the backup image, because it is unable to distinguish between data content and metadata and it is not equipped to handle different backup image formats.

C. Deduplication

Once the image adapter 131 has determined the format of the backup image 101 and/or the data objects 105 that comprise the backup image 101, the deduplication engine 151 may perform its function of detecting multiple instances of data. One skilled in the art will appreciate that the deduplication engine 151 may receive the data content of the data object 105 without any metadata 103 for that data object 105, before performing the deduplication. There are many methods for determining whether there are multiple instances of data. For example, U.S. Pat. Nos. 6,704,720 and 6,810,398, which are incorporated in full herein, disclose methods that may be performed by the deduplication engine 131.

Specifically, an embodiment of the present invention provides that the deduplication engine 151 receives data streamed from the image adapter 131, and analyzes the data for multiple instances before storing a single instance of each data object in associated disk storage 171 or tape storage 191. Deduplication may be performed through the use of hash functions and hash IDs. By assigning hash IDs to the data objects streamed from the image adapter 131, the deduplication engine 151 is able to identify whether a data object has been streamed and stored before. In an embodiment, the image adapter 131 may assign hash IDs to data objects prior to transmission to the deduplication engine 151.

A person having ordinary skill in the art will recognize that in a general fashion, deduplication may involve associating two different hash IDs: a composite hash ID, and an atomic hash ID. This provides at least two ways to check for multiple instances for a data object. A composite hash ID may be assigned to an entire data object. In most storage systems, data objects are divided up into even-sized "chunks" or blocks of data. For example, a data block may be 128 bytes in size, and a data object may occupy or take up multiple data blocks on a storage medium. In deduplication, a data block may also be assigned a hash ID, known as an atomic hash ID. An atomic hash ID is more granular than a composite hash ID, which, as previously mentioned, is assigned to the entire data object. During deduplication, the deduplication engine 151 will assign a composite hash ID to the data object streamed from the image adapter 131, and will also assign an atomic hash ID for each data block streamed from the image adapter 131.

The deduplication engine 151 knows to only assign a composite or atomic hash ID once. If a second instance of a data object is streamed to the deduplication engine 151, the deduplication engine 151 will try to assign the same hash ID to that data object. If this happens, the deduplication engine 151 will realize that this composite hash ID has already been assigned, and that therefore, the data object is a second instance of a data object already stored. Similarly, if certain data content has already been assigned a hash ID, such as an atomic hash ID for specific data content in a data block, the deduplication engine 151 will recognize if certain content has already been stored. Assigning and comparing composite and atomic hash IDs to data objects and data blocks streamed from the image adapter 131 provides one method of deduplication for the present invention. One skilled in the art will appreciate that other methods are possible as well without departing from the scope of the present invention.

D. Restoration

An important purpose of backup and archival of data is the ability to restore this data in the event of a disaster. This is known as restoration or recovery. Aspects of the present invention permit restoration of data objects stored by the deduplication engine 151.

Restoration may require use of the catalog 141 associated with the image adapter 131. As noted previously, the catalog 141 is a database of information generated by the image adapter 131 and/or the deduplication engine 151. For example, during decoding, the image adapter 131 may extract the metadata 103 associated with a data object 105 from the backup image 101. This metadata 103 will contain the original path information for the data object 105. In other words, the metadata 103 will identify exactly where on the file system data object 105 was located before it was backed up to backup image 101. Since only the data object 105 is streamed to the deduplication engine 151, if this path information metadata is not retained, then the backup and recovery application may not be able to re-create the backed up file system. As such, it is important to store this information in a database such as catalog 141. In an embodiment, the information stored in catalog 141 may be limited to only the information necessary to perform a restore, and as such, additional metadata not necessary for restoration may be left out of the catalog 141 database in order to keep its memory footprint small.

One will also appreciate that once the data object 105 is streamed to the deduplication engine 151, it may be stored as a single instance in either disk 171 or tape 191. If the backup image 101, and therefore the original file system, contained multiple instances of a data object, the location and/or number of these instances may be lost. The only information generated by the deduplication engine 151 is the composite and atomic hash IDs for those data objects. In order to keep track of the number of instances of a backed up data object 105 that existed in the backup image 101 or the original file system, it is important that the hash IDs and number of instances is stored with the other metadata for those data objects. As such, the catalog 141 will contain hash ID information and path or other mapping information for each of the data objects deduplicated by the deduplication engine 151 and stored by the deduplication engine 151.

Restoration may therefore be performed using the hash ID and path information for the deduplicated data objects. If a file system needs to be restored, the recovery application may refer to the database in catalog 141 to identify not only the structure and location of each backed up data object, but also where multiple instances of certain data objects were located. As such, the present invention not only provides deduplication features to previously archived backup images, but also enables restoration of those backup images without any loss of data or file system structure. As a further benefit, because archived backup images have been deduplicated using the present invention, restoration may be made more efficient, since only a single instance of a data object is stored, reducing the number of archive media to recover. Since the quantity of archive media is reduced, it may require less time to navigate and recover the backed up file system.

E. Other Features of the Present Invention

A person having ordinary skill in the art will appreciate that there may be other benefits of the present invention as well. For example, the present invention may also increase backup and deduplication efficiency by providing "synthetic full" or "consolidated backup" functionality. A person having ordinary skill in the art will appreciate that a synthetic full backup is a type of backup whereby the backup server combines the most recent full backup and associated series of incremental backups to generate a backup image that is no different than if a full backup had been performed. If an organization already performs periodic full backups, with incremental backups in-between each full backup, it may be advantageous to combine the incremental backups with the previous full backup, rather than perform a full backup. Synthetic full backups may be less time consuming than a full backup, but may retain all of the data that would have been stored in a full backup session.

The present invention enables the image adapter 131 in conjunction with the deduplication engine 151 to perform synthetic full backups. As a result, the backup system benefits from a more efficient process than full backup, as well as the decreased use of memory resources from the deduplication process. In an embodiment, the image adapter may be able to calculate whether or not a backup image is from an incremental backup or a full backup by reading the time when a image was created, as well as the size of the image.

Once the image adapter 131 has identified which backup image resulted from an incremental backup, and which one resulted from a full backup, the image adapter 131 may organize the backup images temporally so that only the latest versions of the data objects that comprise the backup image are streamed to the deduplication engine. In this fashion, while the original archive media may contain both full and incremental backup images, the image adapter 131 may perform consolidation operations such that only a synthetic full backup image is deduplicated by the deduplication engine 151. As a result, if a full backup image is missing from an archive, or was never created, the present invention can create a synthetic full backup image, while still providing deduplication on the archived files.

In an embodiment, the image adapter 131 may also be able to identify which full backup images and which incremental backup images have already been streamed to the deduplication engine 151 for deduplication. Rather than store both the full and incremental backup images in disk 171 or tape 191, the image adapter 131 may create a synthetic full backup image from these previous backup images, thereby streamlining archive media even after the backup images have been deduplicated by the present invention.

One will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of the preferred embodiments is not intended to limit the scope of the claims appended hereto.

What is claimed is:

1. A method comprising:
   receiving a previously stored backup image from archive media, the previously stored backup image comprising a plurality of data objects including data content and metadata for each of the plurality of data objects;
   decoding, by an image adapter engine, the previously stored backup image to identify (i) a format of the previously stored backup image using the metadata for each of the plurality of data objects and metadata associated with the backup image from the archive media, (ii) the data content of the plurality of data objects, and (iii) an original path information for the backup image as the backup image originally existed before a backup;

transmitting the data content of the plurality of data objects to a deduplication engine, thereby enabling the deduplication engine to a store single instance of the data content to the archive media; and storing information to perform a restoration of the backup image comprising the metadata, a hash ID and the original path information for each of the plurality of data objects, the metadata associated with the backup image from the archive media, the information to perform the restoration being stored separately from the backup image.

2. The method of claim 1, wherein decoding comprises reading the metadata for each of the plurality of data objects to determine the format of the previously stored backup image.

3. The method of claim 1, wherein decoding comprises reading metadata associated with the backup image to determine the format of the previously stored backup image.

4. The method of claim 1, wherein the hash ID is provided by the deduplication engine, and the path address is contained in the metadata for each of the plurality of data objects.

5. The method of claim 4, further comprising restoring the plurality of data objects from single instance storage by referring to the hash ID and the path address for each of the plurality of data objects.

6. A system comprising:

an archive medium storing at least one backup image comprising a plurality of data objects including data content and metadata for each of the plurality of data objects;

an image adapter for decoding the stored at least one backup image to identify (i) a format of the previously stored backup image using the metadata for each of the plurality of data objects and metadata associated with the backup image from the archive media, (ii) the data content of the plurality of data objects, and (iii) an original path information for the backup image as the backup image originally existed before a backup;

a deduplication engine storing a store single instance of the data content to the archive media; and a storage for storing information to perform a restoration of the backup image comprising the metadata, a hash ID and the original path information for each of the plurality of data objects, the metadata associated with the backup image from the archive media, the information to perform the restoration being stored separately from the backup image.

7. The system of claim 6, wherein decoding comprises reading the metadata for each of the plurality of data objects to determine the format of the stored at least one backup image.

8. The system of claim 6, wherein decoding comprises reading metadata associated with the backup image to determine the format of the stored at least one backup image.

9. A computer program product, comprising a non-transitory computer usable medium having a computer readable program code embodied therein, the computer readable program code adapted to be executed by one or more processors, the program code including instructions to:

receive a previously stored backup image from archive media, the previously stored backup image comprising a plurality of data objects including data content and metadata for each of the plurality of data objects;

decode, by an image adapter engine, the previously stored backup image to identify (i) a format of the previously stored backup image using the metadata for each of the plurality of data objects and metadata associated with the backup image from the archive media, (ii) the data content of the plurality of data objects, and (iii) an original path information for the backup image as the backup image originally existed before a backup;

transmit the data content of the plurality of data objects to a deduplication engine, thereby enabling the deduplication engine to a store single instance of the data content to the archive media; and store information to perform a restoration of the backup image comprising the metadata, a hash ID and the original path information for each of the plurality of data objects, the metadata associated with the backup image from the archive media, the information to perform the restoration being stored separately from the backup image.

10. The computer program product of claim 9, wherein decoding comprises reading the metadata for each of the plurality of data objects to determine the format of the previously stored backup image.

11. The computer program product of claim 9, wherein decoding comprises reading metadata associated with the backup image to determine the format of the previously stored backup image.

12. The computer program product of claim 9, wherein the hash ID is provided by the deduplication engine, and the path address is contained in the metadata for each of the plurality of data objects.

13. The computer program product of claim 12, the program code including further instructions to restore the plurality of data objects from single instance storage by referring to the hash ID and the original path information for each of the plurality of data objects.

* * * * *